(12) United States Patent
Wang

(10) Patent No.: US 11,567,303 B2
(45) Date of Patent: Jan. 31, 2023

(54) CAMERA OPTICAL LENS

(71) Applicant: AAC Optics (Changzhou) Co., Ltd., Changzhou (CN)

(72) Inventor: Qiang Wang, Shenzhen (CN)

(73) Assignee: AAC Optics (Changzhou) Co., Ltd., Changzhou (CN)

(*) Notice: Subject to any disclaimer, the term of this patent is extended or adjusted under 35 U.S.C. 154(b) by 232 days.

(21) Appl. No.: 17/129,953

(22) Filed: Dec. 22, 2020

(65) Prior Publication Data

US 2021/0263279 A1 Aug. 26, 2021

(30) Foreign Application Priority Data

Feb. 24, 2020 (CN) .......................... 202010111295.5

(51) Int. Cl.
*G02B 13/00* (2006.01)
*G02B 9/60* (2006.01)
*G02B 27/00* (2006.01)

(52) U.S. Cl.
CPC ........... *G02B 13/0045* (2013.01); *G02B 9/60* (2013.01); *G02B 27/0025* (2013.01)

(58) Field of Classification Search
CPC ...... G02B 9/60; G02B 13/0045; G02B 13/02; G02B 27/0025
See application file for complete search history.

(56) References Cited

U.S. PATENT DOCUMENTS

2020/0103629 A1* 4/2020 Teraoka ................... G02B 9/60

* cited by examiner

*Primary Examiner* — Jack Dinh
(74) *Attorney, Agent, or Firm* — W&G Law Group

(57) ABSTRACT

Provided is a camera optical lens including first to fifth lenses. The camera optical lens satisfies: $0.35 \leq f1/f \leq 0.65$; $2.00 \leq f5/f \leq 4.00$; $0.90 \leq d6/d8 \leq 1.30$; and $-10.00 \leq (R5+R6)/(R5-R6) \leq -2.00$, where f denotes a focal length of the camera optical lens; f1 denotes a focal length of the first lens; f5 denotes a focal length of the fifth lens; d6 denotes an on-axis distance from an image side surface of the third lens to an object side surface of the fourth lens; d8 denotes an on-axis distance from an image side surface of the fourth lens to an object side surface of the fifth lens; and R5 and R6 respectively denote curvature radiuses of an object side surface and an image side surface of the third lens. The camera optical lens can achieve good optical performance while satisfying design requirements for ultra-thin, long-focal-length lenses having large apertures.

10 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is conventionally equipped in mobile phone cameras adopts a three-piece or four-piece lens structure. Also, with the development of technology and the increasingly diverse demands from users, the pixel area of photosensitive devices is becoming smaller and smaller and the requirement of the system on the imaging quality is improving constantly, such that a five-piece lens structure gradually emerges in lens designs. It is urgent to provide a camera optical lens with excellent optical characteristics, ultra-thin and long-focal-length.

SUMMARY

In view of the problems, the present disclosure provides a camera optical lens, which can achieve good optical performance while satisfying design requirements for ultra-thin, long-focal-length lenses having large apertures.

A technical solution of the present disclosure is as follows: a camera optical lens includes, from an object side to an image side, a first lens, a second lens, a third lens, a fourth lens, and a fifth lens. The camera optical lens satisfies following conditions: $0.35 \leq f1/f \leq 0.65$; $2.00 \leq f5/f \leq 4.00$; $0.90 \leq d6/d8 \leq 1.30$; and $-10.00 \leq (R5+R6)/(R5-R6) \leq -2.00$, where f denotes a focal length of the camera optical lens; f1 denotes a focal length of the first lens; f5 denotes a focal length of the fifth lens; d6 denotes an on-axis distance from an image side surface of the third lens to an object side surface of the fourth lens; d8 denotes an on-axis distance from an image side surface of the fourth lens to an object side surface of the fifth lens; R5 denotes a curvature radius of an object side surface of the third lens; and R6 denotes a curvature radius of the image side surface of the third lens.

As an improvement, the camera optical lens further satisfies a following condition of $0.10 \leq d2/d4 \leq 0.40$, where d2 denotes an on-axis distance from an image side surface of the first lens to an object side surface of the second lens; and d4 denotes an on-axis distance from an image side surface of the second lens to the object side surface of the third lens.

As an improvement, the camera optical lens further satisfies following conditions: $-1.81 \leq (R1+R2)/(R1-R2) \leq -0.43$; and $0.07 \leq d1/TTL \leq 0.22$, where R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $-2.02 \leq f2/f \leq -0.26$; $0.38 \leq (R3+R4)/(R3-R4) \leq 1.72$; and $0.02 \leq d3/TTL \leq 0.07$, where f2 denotes a focal length of the second lens; R3 denotes a curvature radius of an object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $1.01 \leq f3/f \leq 3.70$; and $0.03 \leq d5/TTL \leq 0.27$, where f3 denotes a focal length of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $-2.20 \leq f4/f \leq -0.48$; $0.25 \leq (R7+R8)/(R7-R8) \leq 2.24$; and $0.04 \leq d7/TTL \leq 0.24$, where f4 denotes a focal length of the fourth lens; R7 denotes a curvature radius of the object side surface of the fourth lens; R8 denotes a curvature radius of the image side surface of the fourth lens; d7 denotes an on-axis thickness of the fourth lens; and TTL denotes a total optical length from an object side surface of the first lens to an image plane of the camera optical lens along an optic axis.

As an improvement, the camera optical lens further satisfies following conditions: $-5.94 \leq (R9+R10)/(R9-R10) \leq 3.16$; and $0.03 \leq d9/TTL \leq 0.23$, where R9 denotes a curvature radius of the object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies a following condition of $TTL/IH \leq 3.31$, where TTL denotes a total optical length from an object side surface of the first lens to an image plane of the camera optical lens along an optic axis; and IH denotes an image height of the camera optical lens.

As an improvement, the camera optical lens further satisfies a following condition of $f/IH \geq 2.57°$, where IH denotes an image height of the camera optical lens.

As an improvement, the camera optical lens further satisfies a following condition of $Fno \leq 2.43$, where Fno denotes an F number of the camera optical lens.

The present disclosure has the following advantageous effects.

The camera optical lens according to the present disclosure achieves has optical performance while satisfying design requirements for ultra-thin, long-focal-length lenses having large apertures.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
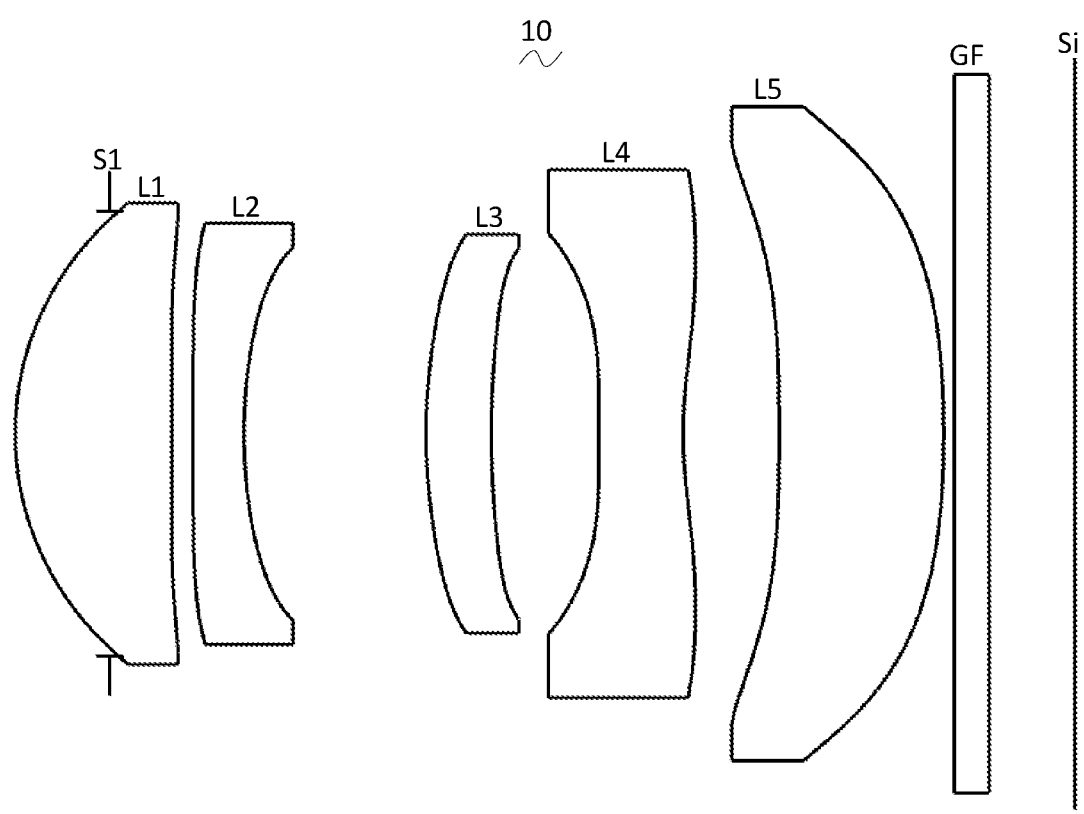
FIG. 1 is a schematic diagram of a structure of a camera optical lens according to Embodiment 1 of the present disclosure.

Referring to FIG. 1-4, the present disclosure provides a camera optical lens 10 in Embodiment 1. In FIG. 1, a left side is an object side, and a right side is an image side. The camera optical lens 10 mainly includes five lenses, i.e., including, from an object side to an image side, an aperture S1, a first lens L1, a second lens L2, a third lens L3, a fourth lens L4, and a fifth lens L5. A glass filter (GF) is arranged between the fifth lens L5 and an image plane Si, and the glass filter (GF) can be a glass plate or can be an optical filter.

In the present embodiment, a focal length of the camera optical lens 10 is defined as f, a focal length of the first lens L1 is defined as f1, a focal length of the fifth lens L5 is defined as f5, an on-axis distance from an image side surface of the third lens L3 to an object side surface of the fourth lens L4 is defined as d6, an on-axis distance from an image side surface of the fourth lens L4 to an object side surface of the fifth lens L5 is defined as d8, a curvature radius of an object side surface of the third lens L3 is defined as R5, and a curvature radius of the image side surface of the third lens L3 is defined as R6. The camera optical lens 10 should satisfy following conditions:

$$0.35 \le f1/f \le 0.65 \quad (1);$$

$$2.00 \le f5/f \le 4.00 \quad (2);$$

$$0.90 \le d6/d8 \le 1.30 \quad (3); \text{ and}$$

$$-10.00 \le (R5+R6)/(R5-R6) \le -2.00 \quad (4).$$

When f1/f satisfies the above condition (1), the refractive power of the first lens L1 can be effectively distributed, so as to correct the aberration of the optical system, thereby improving the imaging quality.

The condition (2) specifies a ratio of the focal length f5 of the fifth lens L5 to the focal length of the system. This condition facilitates to improving the performance of the optical system.

When d6/d8 satisfies the condition (3), a ratio of an air space between the third and fourth lenses to an air space between the fourth and fifth lenses can be effectively distributed. This condition facilitates the assembly of lenses.

The condition (4) specifies the shape of the third lens L3. This condition can alleviate the deflection of light passing through the lens while effectively reducing aberrations.

An on-axis distance from an image side surface of the first lens L1 to an object side surface of the second lens L2 is defined as d2, and an on-axis distance from an image side surface of the second lens L2 to the object side surface of the third lens L3 is defined as d4. The camera optical lens 10 should satisfy a condition of $0.10 \le d2/d4 \le 0.40$. When d2/d4 satisfies this condition, the long-focal-length lenses can be achieved.

In the present embodiment, the first lens L1 has a positive refractive power, and the first lens L1 includes an object side surface being convex in a paraxial region and an image side surface being convex in the paraxial region.

A curvature radius of the object side surface of the first lens L1 is defined as R1, and a curvature radius of the image side surface of the first lens L1 is defined as R2. The camera optical lens 10 should satisfy a condition of $-1.81 \le (R1+R2)/(R1-R2) \le -0.43$, which can appropriately control a shape of the first lens L1 in such a manner that the first lens L1 can effectively correct spherical aberrations of the system. As an example, $-1.13 \le (R1+R2)/(R1-R2) \le -0.54$.

An on-axis thickness of the first lens L1 is defined as d1, and a total optical length from the object side surface of the first lens L1 to an image plane of the camera optical lens along an optic axis is defined as TTL. The camera optical lens 10 should satisfy a condition of $0.07 \le d1/TTL \le 0.22$, which can achieve the ultra-thin lenses. As an example, $0.11 \le d1/TTL \le 0.18$.

In the present embodiment, the second lens L2 has a negative refractive power, and the second lens L2 includes the object side surface being concave in a paraxial region and the image side surface being concave in the paraxial region.

A focal length of the second lens L2 is defined as f2. The camera optical lens 10 should satisfy a condition of $-2.02 \le f2/f \le -0.26$. By controlling the negative refractive power of the second lens L2 in an appropriate range, the aberration of the optical system can be advantageously corrected. As an example, $-1.27 \le f2/f \le -0.32$.

A curvature radius of the object side surface of the second lens L2 is defined as R3, and a curvature radius of the image side surface of the second lens L2 is defined as R4. The camera optical lens 10 should satisfy a condition of $0.38 \le (R3+R4)/(R3-R4) \le 1.72$, which specifies a shape of the second lens L2. This condition can facilitate the correction of an on-axis aberration with the development towards ultra-thin lenses. As an example, $0.60 \leq (R3+R4)/(R3-R4) \leq 1.38$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \leq d3/TTL \leq 0.07$, which can achieve the ultra-thin lenses. As an example, $0.03 \leq d3/TTL \leq 0.06$.

In the present embodiment, the third lens L3 has a positive refractive power, and the third lens L3 includes the object side surface being convex in a paraxial region and the image side surface being concave in the paraxial region.

A focal length of the third lens L3 is defined as f3, and the focal length of the camera optical lens 10 is defined as f. The camera optical lens 10 further satisfies a condition of $1.01 \leq f3/f \leq 3.70$. The appropriate distribution of the positive refractive power leads to better imaging quality and a lower sensitivity of the system. As an example, $1.62 \leq f3/f \leq 2.96$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.03 \leq d5/TTL \leq 0.27$, which can achieve the ultra-thin lenses. As an example, $0.05 \leq d5/TTL \leq 0.22$.

In the present embodiment, the fourth lens L4 has a negative refractive power, and the fourth lens L4 includes the object side surface being concave in a paraxial region and the image side surface being concave in the paraxial region.

A focal length of the fourth lens L4 is f4, and the focal length of the camera optical lens 10 is f. The camera optical lens 10 further satisfies a condition of $-2.20 \leq f4/f \leq -0.48$. The appropriate distribution of the negative refractive power leads to better imaging quality and a lower sensitivity of the system. As an example, $-1.37 \leq f4/f \leq -0.60$.

A curvature radius of the object side surface of the fourth lens L4 is defined as R7, and a curvature radius of the image side surface of the fourth lens L4 is defined as R8. The camera optical lens 10 should satisfy a condition of $0.25 \leq (R7+R8)/(R7-R8) \leq 2.24$, which specifies a shape of the fourth lens L4. This condition can facilitate the correction of an off-axis aberration with the development towards ultra-thin lenses. As an example, $0.39 \leq (R7+R8)/(R7-R8) \leq 1.80$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.04 \leq d7/TTL \leq 0.24$, which can achieve the ultra-thin lenses. As an example, $0.06 \leq d7/TTL \leq 0.19$.

In the present embodiment, the fifth lens L5 has a positive refractive power, and the fifth lens L5 includes an object side surface being concave in a paraxial region and an image side surface being convex in the paraxial region.

A curvature radius of the object side surface of the fifth lens L5 is defined as R9, and a curvature radius of the image side surface of the fifth lens L5 is defined as R10. The camera optical lens 10 should satisfy a condition of $-5.94 \leq (R9+R10)/(R9-R10) \leq 3.16$, which specifies a shape of the fifth lens L5. This condition can facilitate the correction of an off-axis aberration with the development towards ultra-thin lenses. As an example, $-3.71 \leq (R9+R10)/(R9-R10) \leq 2.53$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.03 \leq d9/TTL \leq 0.23$, which can achieve the ultra-thin lenses. As an example, $0.04 \leq d9/TTL \leq 0.19$.

In the present embodiment, the total optical length of the camera optical lens 10 is defined as TTL, and an image height of the camera optical lens 10 is defined as IH. The camera optical lens 10 should satisfy a condition of $TTL/IH \leq 3.31$, which can achieve the ultra-thin lenses.

In the present embodiment, an image height of the camera optical lens 10 is defined as IH, and the focal length of the camera optical lens 10 is defined as f. The camera optical lens 10 should satisfy a condition of $f/IH \geq 2.57°$, thereby achieving a long focal length.

In the present embodiment, an F number (FNO) of the camera optical lens 10 is smaller than or equal to 2.43, thereby achieving a large aperture and high imaging performance.

In the present embodiment, the focal length of the camera optical lens 10 is defined as f, and a combined focal length of the first lens L1 and the second lens L2 is defined as f12. The camera optical lens 10 should satisfy a condition of $0.46 \leq f12/f \leq 1.81$, which can eliminate aberration and distortion of the camera optical lens 10, suppress the back focal length of the camera optical lens 10, and maintain miniaturization of the camera lens system group. As an example, $0.73 \leq f12/f \leq 1.45$.

In addition, in the camera optical lens 10 provided by the present embodiment, the surface of each lens can be set as an aspherical surface, and it is easy for the aspherical surface to be made into a shape other than a spherical surface, to obtain more control variables for reducing aberrations, thereby reducing the number of lenses used, so that the total length of the camera optical lens 10 can be effectively reduced. In the present embodiment, both the object side surface and the image side surface of each lens are aspherical surfaces.

It should be understood that, the first lens L1, the second lens L2, the third lens L3, the fourth lens L4, and the fifth lens L5 have the structure and parameter relationship as described above, and thus the camera optical lens 10 can appropriately distribute the refractive power, space and shape of each lens, thereby correcting various aberrations In addition, an inflection point and/or an arrest point can be provided on at least one of the object side surface and the image side surface of each lens, in order to meet the requirements of high-quality imaging, and the specific implementations are described below.

The design data of the camera optical lens 10 shown in FIG. 1 is shown below.

Table 1 includes the curvature radius of the object side surface and the curvature radius R of the image side surface of the first lens L1 to the fifth lens L5 that constitute the camera optical lens 10 in the Embodiment 1 of the present disclosure, the on-axis thickness of each lens, the distance d between adjacent lenses, refractive index nd and abbe number vd. It should be noted that the focal length, on-axis distance, curvature radius, on-axis thickness, inflexion point position, and arrest point position are all in units of mm.

TTL: total optical length (total optical length from the object side surface of the first lens L1 to the image plane of the camera optical lens along the optic axis) in mm.

TABLE 1

| | R | d | nd | vd |
|---|---|---|---|---|
| S1 | ∞ | d0 = −0.570 | | |
| R1 | 1.820 | d1 = 0.948 | nd1 1.5444 | v1 55.82 |
| R2 | −36.706 | d2 = 0.128 | | |
| R3 | −140.049 | d3 = 0.306 | nd2 1.6610 | v2 20.53 |
| R4 | 3.323 | d4 = 1.099 | | |
| R5 | 3.633 | d5 = 0.394 | nd3 1.6610 | v3 20.53 |
| R6 | 5.479 | d6 = 0.650 | | |
| R7 | −1012.696 | d7 = 0.508 | nd4 1.5444 | v4 55.82 |
| R8 | 2.618 | d8 = 0.580 | | |
| R9 | −19.399 | d9 = 0.993 | nd5 1.5444 | v5 55.82 |
| R10 | −6.644 | d10 = 0.065 | | |
| R11 | ∞ | d11 = 0.210 | ndg 1.5168 | vg 64.17 |
| R12 | ∞ | d12 = 0.521 | | |

In the table, meanings of various symbols will be described as follows.

S1: aperture;

R: curvature radius of an optical surface, a central curvature radius of a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of an object side surface of the optical filter GF;

R12: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the optical filter GF;

d11: on-axis thickness of the optical filter GF;

d12: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 5.5863E−02 | −3.4947E−03 | 4.9540E−03 | −7.2513E−03 | 4.1792E−03 | −3.8510E−04 | −3.5755E−04 | 2.9529E−05 |
| R2 | 4.8796E+01 | 2.4033E−02 | −4.1666E−03 | 5.6823E−03 | −1.9814E−03 | 8.6482E−05 | −9.6068E−04 | 3.7722E−04 |
| R3 | 1.5056E+02 | 1.3953E−02 | 6.4358E−03 | 4.2012E−03 | −1.6216E−03 | −6.8356E−04 | −3.4753E−04 | 3.6135E−04 |
| R4 | 6.4323E+00 | −1.9233E−02 | 1.3209E−02 | 1.0112E−03 | −5.7740E−03 | 4.0708E−03 | 2.8014E−03 | −2.6787E−03 |
| R5 | −6.1603E+00 | −1.2250E−02 | 1.0753E−02 | 4.1609E−03 | 7.4154E−03 | −1.5773E−03 | −1.6990E−03 | 5.5426E−04 |
| R6 | −3.1121E+01 | −1.3936E−02 | 2.3955E−02 | −9.6348E−03 | 2.5589E−02 | 4.9157E−05 | −1.1342E−02 | 4.8122E−03 |
| R7 | 1.5005E+02 | −2.0691E−01 | 5.7083E−02 | 1.6983E−02 | −1.3660E−02 | −1.1106E−04 | −6.6570E−04 | 4.8770E−04 |
| R8 | −1.6386E+01 | −9.7792E−02 | 3.6698E−02 | 1.7589E−03 | −3.5986E−03 | −5.8718E−04 | 5.9875E−04 | −8.5179E−05 |
| R9 | 3.4246E+01 | −4.4381E−02 | 7.9819E−03 | −3.6058E−04 | −3.1243E−05 | 4.4113E−05 | 1.5333E−06 | −5.0494E−07 |
| R10 | −5.7423E+01 | −6.1392E−02 | 1.2297E−02 | −2.4687E−03 | 1.2786E−04 | −5.6115E−07 | −3.9854E−06 | 1.8039E−06 |

In Table 2, k is a conic coefficient, and A4, A6, A8, A10, A12, A14, and A16 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

In the present embodiment, an aspheric surface of each lens surface uses the aspheric surfaces represented by the above condition (1). However, the present disclosure is not limited to the aspherical polynomial form represented by the condition (1).

Table 3 and Table 4 show design data of inflexion points and arrest points of respective lens in the camera optical lens 10 of the present embodiment. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; and P5R1 and P5R2 represent the object side surface and the image side surface of the fifth lens L5, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

|  | Number of inflexion points | Inflexion point position 1 | Inflexion point position 2 |
| --- | --- | --- | --- |
| P1R1 | 0 | | |
| P1R2 | 2 | 0.315 | 1.195 |
| P2R1 | 1 | 0.205 | |
| P2R2 | 0 | | |
| P3R1 | 0 | | |
| P3R2 | 0 | | |
| P4R1 | 0 | | |
| P4R2 | 1 | 0.475 | |
| P5R1 | 1 | 1.515 | |
| P5R2 | 1 | 1.955 | |

TABLE 4

|  | Number of arrest points | Arrest point position 1 |
| --- | --- | --- |
| P1R1 | 0 | |
| P1R2 | 1 | 0.545 |
| P2R1 | 1 | 0.345 |
| P2R2 | 0 | |
| P3R1 | 0 | |
| P3R2 | 0 | |
| P4R1 | 0 | |
| P4R2 | 1 | 1.085 |
| P5R1 | 0 | |
| P5R2 | 0 | |

Table 13 below further lists various values of Embodiment 1 and parameters which are specified in the above conditions.

Figure 2:
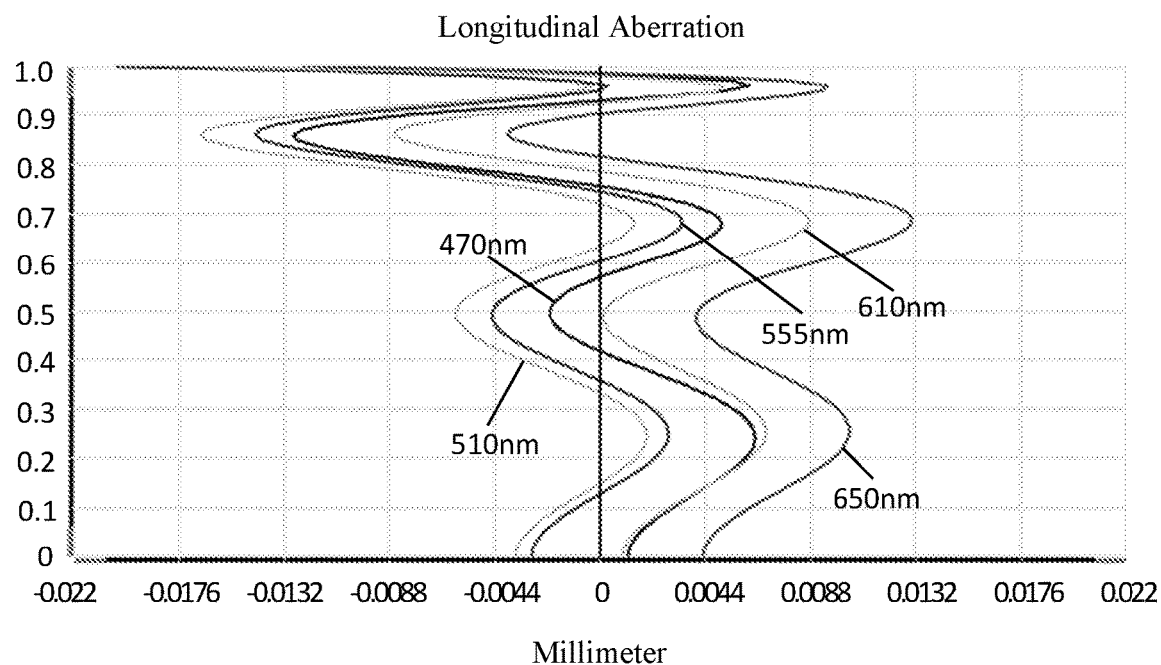
FIG. 2 is a schematic diagram of a longitudinal aberration of the camera optical lens shown in FIG. 1.
Figure 3:
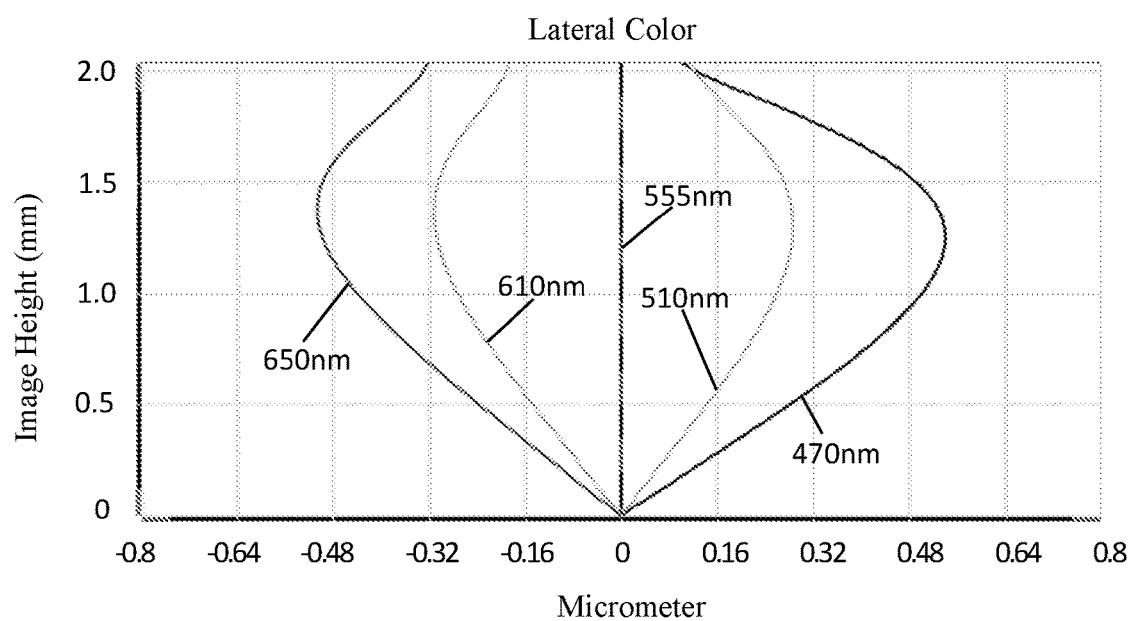
FIG. 3 is a schematic diagram of a lateral color of the camera optical lens shown in FIG. 1.
Figure 4:
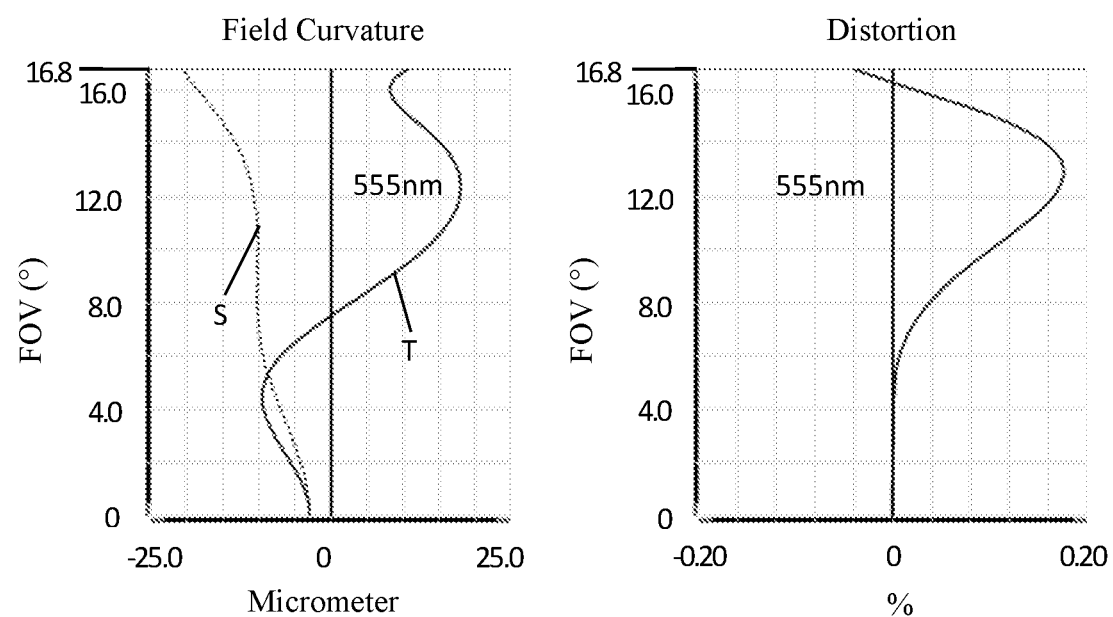
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 470 nm, 510 nm, 555 nm, 610 nm and 650 nm after passing the camera optical lens 10. FIG. 4 illustrates a field curvature and a distortion of light with a wavelength of 555 nm after passing the camera optical lens 10, in which a field curvature S is a field curvature in a sagittal direction and T is a field curvature in a tangential direction.

In the present embodiment, the entrance pupil diameter of the camera optical lens 10 is 2.754 mm. The image height is 2.04 mm. The field of view (FOV) along a diagonal direction is 33.60°. Thus, the camera optical lens 10 is an ultra-thin, large-aperture, long-focal-length lens, thereby leading to better optical characteristics.

Embodiment 2

Figure 5:
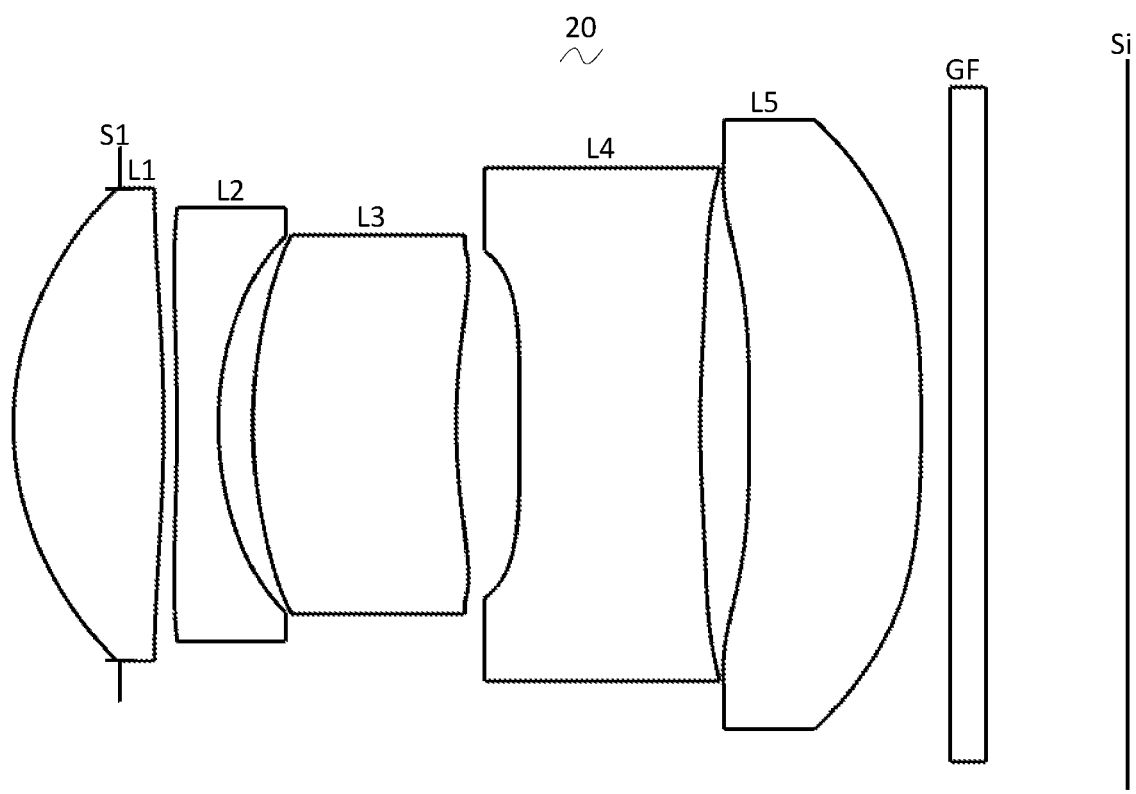
FIG. 5 is a schematic diagram of a structure of a camera optical lens according to Embodiment 2 of the present disclosure.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences therebetween will be described in the following.

Table 5 and Table 6 show design data of a camera optical lens 20 in Embodiment 2 of the present disclosure.

TABLE 5

| | R | d | nd | vd |
| --- | --- | --- | --- | --- |
| S1 | ∞ | d0 = −0.617 | | |
| R1 | 1.854 | d1 = 0.872 | nd1 1.6461 | v1 34.05 |
| R2 | −8.521 | d2 = 0.078 | | |
| R3 | −14.001 | d3 = 0.240 | nd2 1.6610 | v2 20.53 |
| R4 | 1.989 | d4 = 0.201 | | |
| R5 | 2.937 | d5 = 1.183 | nd3 1.5806 | v3 60.08 |
| R6 | 3.593 | d6 = 0.367 | | |
| R7 | −19.724 | d7 = 1.050 | nd4 1.6610 | v4 20.53 |
| R8 | 6.720 | d8 = 0.285 | | |
| R9 | −32.271 | d9 = 1.000 | nd5 1.6610 | v5 20.53 |
| R10 | −11.494 | d10 = 0.167 | | |
| R11 | ∞ | d11 = 0.210 | ndg 1.5168 | vg 64.17 |
| R12 | ∞ | d12 = 0.823 | | |

Table 6 shows aspheric surface data of respective lenses in the camera optical lens 20 according to Embodiment 2 of the present disclosure.

TABLE 6

| | Conic coefficient | Aspherical surface coefficients | | | | | | |
| --- | --- | --- | --- | --- | --- | --- | --- | --- |
| | k | A4 | A6 | A8 | A10 | A12 | A14 | A16 |
| R1 | 4.5974E−02 | −4.4437E−03 | 1.8917E−03 | −5.4304E−03 | 3.3763E−03 | −8.1498E−04 | −3.5208E−04 | 1.4638E−04 |
| R2 | 3.3914E+01 | 2.7011E−02 | −4.9805E−03 | 5.5952E−03 | −1.3759E−03 | 5.7683E−04 | −7.8531E−04 | 3.5484E−04 |
| R3 | 1.0245E+02 | 1.7750E−02 | 7.4476E−03 | 3.2493E−03 | −1.7108E−03 | −2.4098E−04 | −8.6933E−05 | 1.9623E−04 |
| R4 | 1.5338E+00 | −2.7789E−02 | 6.5066E−03 | 9.4963E−03 | −8.5623E−03 | 1.3439E−03 | 3.6233E−03 | −3.8395E−03 |
| R5 | −3.2525E+00 | −1.6413E−03 | 8.2229E−03 | −7.6721E−03 | 1.6773E−02 | −3.1770E−04 | −7.9134E−03 | 3.6238E−03 |
| R6 | −1.6199E+00 | −4.9217E−02 | 9.1553E−04 | −3.0511E−02 | 9.3117E−03 | 6.9123E−03 | −1.9242E−02 | 4.6680E−03 |
| R7 | −9.5934E−02 | −1.6489E−02 | −3.3336E−02 | −7.9170E−03 | −1.1510E−03 | −6.8932E−03 | −1.0364E−02 | 0.0000E+00 |
| R8 | −6.0485E+01 | −4.1095E−02 | 2.0555E−02 | 8.2542E−04 | −5.9976E−04 | −2.8105E−04 | 2.5816E−04 | −8.2057E−05 |
| R9 | 4.1234E+02 | −9.4366E−02 | 2.5990E−02 | 7.2635E−03 | −8.7413E−04 | −4.1134E−04 | 2.5568E−05 | −5.5175E−06 |
| R10 | 8.7968E+00 | −7.0158E−02 | 1.0701E−02 | −6.4388E−04 | −7.5566E−05 | −3.7317E−05 | 2.1424E−05 | −2.8863E−06 |

Table 7 and Table 8 show design data of inflexion points and arrest points of respective lens in the camera optical lens 20.

TABLE 7

|  | Number of inflexion points | Inflexion point position 1 | Inflexion point position 2 | Inflexion point position 3 |
|---|---|---|---|---|
| P1R1 | 0 | | | |
| P1R2 | 1 | 0.785 | | |
| P2R1 | 1 | 0.565 | | |
| P2R2 | 0 | | | |
| P3R1 | 0 | | | |
| P3R2 | 1 | 0.605 | | |
| P4R1 | 0 | | | |
| P4R2 | 3 | 0.545 | 0.815 | 1.455 |
| P5R1 | 2 | 1.065 | 1.515 | |
| P5R2 | 0 | | | |

TABLE 8

|  | Number of arrest points | Arrest point position 1 |
|---|---|---|
| P1R1 | 0 | |
| P1R2 | 0 | |
| P2R1 | 1 | 0.905 |
| P2R2 | 0 | |
| P3R1 | 0 | |
| P3R2 | 1 | 0.895 |
| P4R1 | 0 | |
| P4R2 | 0 | |
| P5R1 | 1 | 1.445 |
| P5R2 | 0 | |

Table 13 below further lists various values of Embodiment 2 and parameters which are specified in the above conditions.

Figure 6:
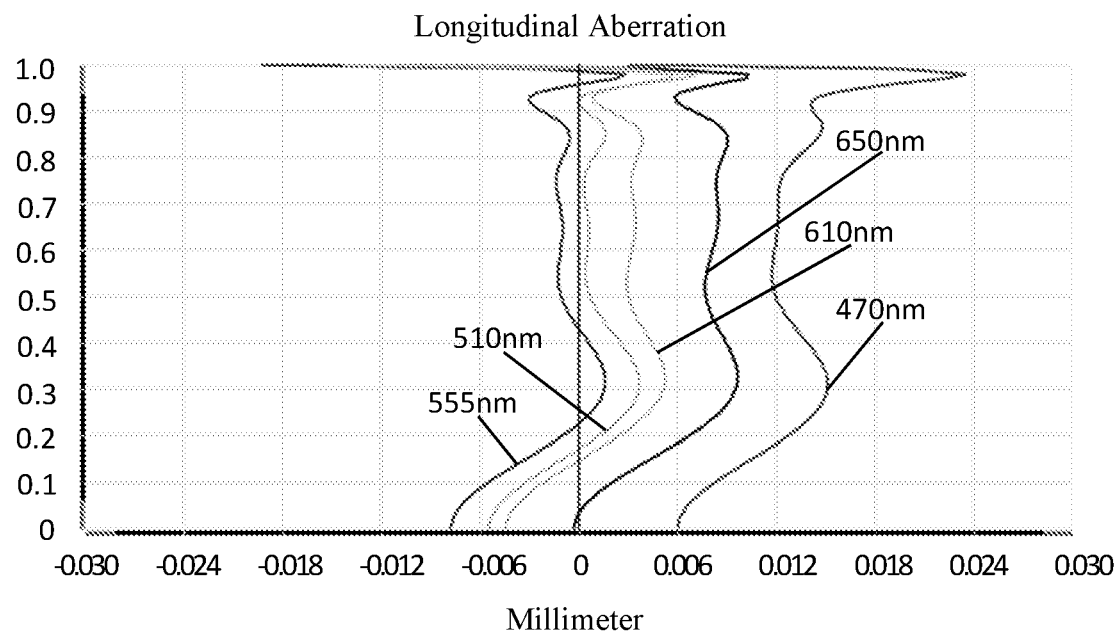
FIG. 6 is a schematic diagram of a longitudinal aberration of the camera optical lens shown in FIG. 5.
Figure 7:
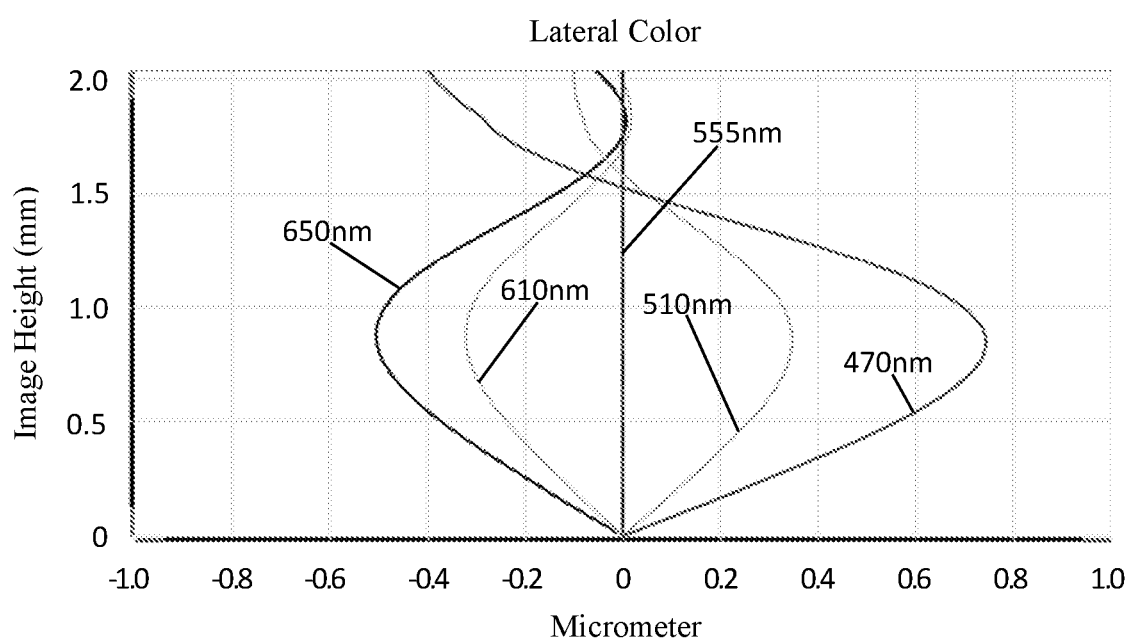
FIG. 7 is a schematic diagram of a lateral color of the camera optical lens shown in FIG. 5.
Figure 8:
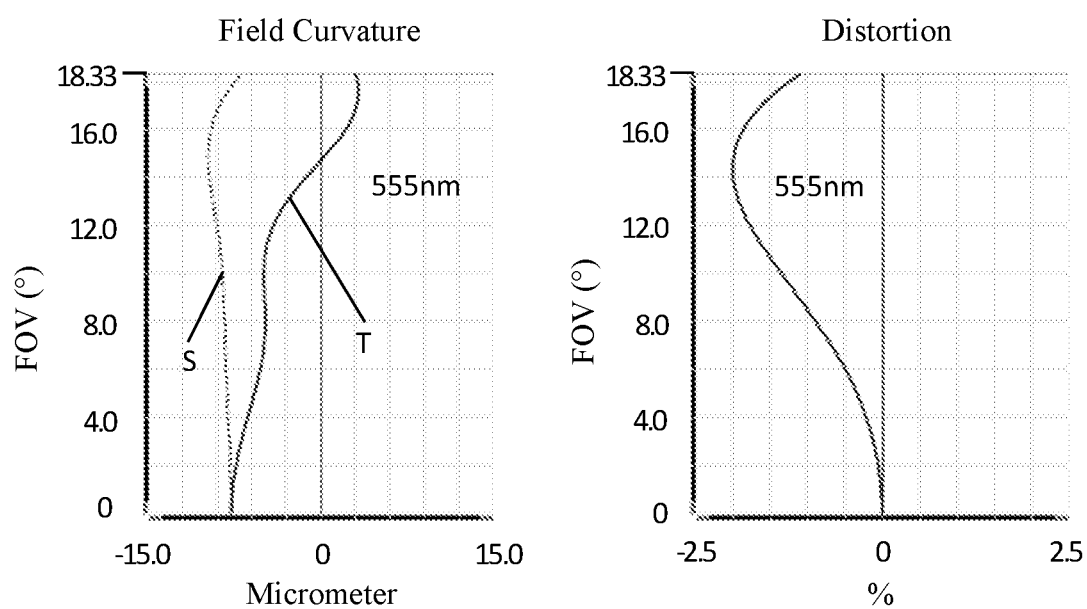
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 555 nm, 510 nm, 610 nm, 650 nm and 470 nm after passing the camera optical lens 20. FIG. 8 illustrates a field curvature and a distortion of light with a wavelength of 555 nm after passing the camera optical lens 20, in which a field curvature S is a field curvature in a sagittal direction and T is a field curvature in a tangential direction.

In the present embodiment, the entrance pupil diameter of the camera optical lens 20 is 2.783 mm. The image height is 2.04 mm. The FOV along a diagonal direction is 36.66°. Thus, the camera optical lens 20 is an ultra-thin, large-aperture, long-focal-length lens, thereby leading to better optical characteristics.

Embodiment 3

Figure 9:
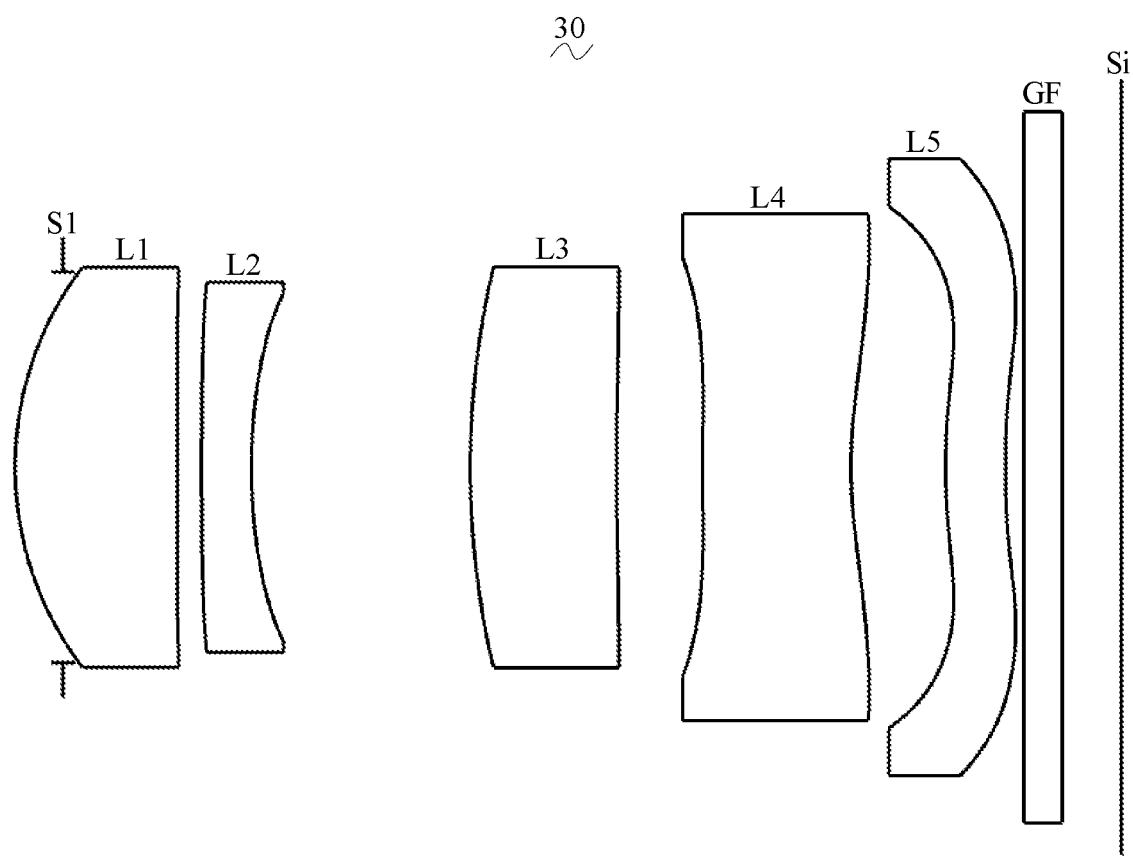
FIG. 9 is a schematic diagram of a structure of a camera optical lens according to Embodiment 3 of the present disclosure.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences therebetween will be described in the following.

The object side surface of the second lens L2 is convex in a paraxial region, the object side surface of the fourth lens L4 is convex in a paraxial region, the object side surface of the fifth lens L5 is convex in a paraxial region, and the image side surface of the fifth lens L5 is concave in a paraxial region.

Table 9 and Table 10 show design data of a camera optical lens 30 in Embodiment 3 of the present disclosure.

TABLE 9

|  | R | d | nd | vd |
|---|---|---|---|---|
| S1 | ∞ | d0 = −0.262 | | |
| R1 | 1.883 | d1 = 0.887 | nd1 1.5346 | v1 55.69 |
| R2 | −35.059 | d2 = 0.131 | | |
| R3 | 48.002 | d3 = 0.272 | nd2 1.6610 | v2 20.53 |
| R4 | 3.293 | d4 = 1.195 | | |
| R5 | 4.750 | d5 = 0.799 | nd3 1.6610 | v3 20.53 |
| R6 | 13.387 | d6 = 0.471 | | |
| R7 | 12.872 | d7 = 0.811 | nd4 1.6153 | v4 25.94 |
| R8 | 2.559 | d8 = 0.517 | | |
| R9 | 3.828 | d9 = 0.328 | nd5 1.6610 | v5 20.53 |
| R10 | 7.712 | d10 = 0.100 | | |
| R11 | ∞ | d11 = 0.210 | ndg 1.5168 | vg 64.17 |
| R12 | ∞ | d12 = 0.322 | | |

Table 10 shows aspheric surface data of respective lenses in the camera optical lens 30 according to Embodiment 3 of the present disclosure.

TABLE 10

|  | Conic coefficient | Aspherical surface coefficients | | | | | | |
|---|---|---|---|---|---|---|---|---|
|  | k | A4 | A6 | A8 | A10 | A12 | A14 | A16 |
| R1 | 1.2326E−01 | −6.9918E−04 | 8.5374E−03 | −2.7958E−02 | 4.9389E−02 | −4.7576E−02 | 2.3286E−02 | −4.5911E−03 |
| R2 | 2.0000E+02 | 3.5120E−02 | −2.7142E−02 | 2.4843E−02 | −2.8236E−02 | 2.2847E−02 | −9.4356E−03 | 1.5175E−03 |
| R3 | −2.0000E+02 | 2.4428E−02 | −3.3000E−02 | 5.6803E−02 | −8.1831E−02 | 8.1203E−02 | −4.0101E−02 | 7.4197E−03 |
| R4 | 6.5076E+00 | −5.8985E−03 | −1.6645E−02 | 6.0309E−02 | −1.0795E−01 | 1.1871E−01 | −6.1671E−02 | 1.0734E−02 |
| R5 | −7.8315E+00 | −2.8044E−03 | 2.2675E−02 | −4.8826E−02 | 6.1616E−02 | −4.3697E−02 | 1.8212E−02 | −3.2030E−03 |
| R6 | −2.6541E+02 | −3.8023E−02 | 6.6788E−02 | −9.4816E−02 | 7.0407E−02 | −2.3610E−02 | 1.6268E−03 | 1.2771E−03 |
| R7 | 2.3268E+01 | −1.7208E−01 | 1.5253E−01 | −1.1175E−01 | 2.3769E−02 | 1.4866E−02 | −7.3179E−03 | 8.9391E−04 |
| R8 | −6.9243E+00 | −1.5058E−01 | 1.1870E−01 | −4.1372E−02 | −8.3486E−03 | 1.0537E−02 | −2.7164E−03 | 2.2868E−04 |
| R9 | −5.3372E+01 | 1.5905E−01 | −5.2199E−01 | 3.9941E−01 | −8.7072E−02 | −4.3698E−02 | 2.5068E−02 | −3.4282E−03 |
| R10 | 1.5070E+01 | 2.6267E−01 | −6.4135E−01 | 5.7820E−01 | −2.8613E−01 | 7.9937E−02 | −1.1857E−02 | 7.2649E−04 |

Table 11 and Table 12 show design data of inflexion points and arrest points of respective lens in the camera optical lens 30.

TABLE 11

|  | Number of inflexion points | Inflexion point position 1 | Inflexion point position 2 |
|---|---|---|---|
| P1R1 | 0 | | |
| P1R2 | 1 | 0.285 | |
| P2R1 | 0 | | |
| P2R2 | 0 | | |
| P3R1 | 0 | | |

TABLE 11-continued

|  | Number of inflexion points | Inflexion point position 1 | Inflexion point position 2 |
|---|---|---|---|
| P3R2 | 2 | 0.485 | 0.965 |
| P4R1 | 1 | 0.205 | |
| P4R2 | 1 | 0.535 | |
| P5R1 | 1 | 0.465 | |
| P5R2 | 1 | 0.575 | |

TABLE 12

|  | Number of arrest points | Arrest point position 1 |
|---|---|---|
| P1R1 | 0 | |
| P1R2 | 1 | 0.525 |
| P2R1 | 0 | |
| P2R2 | 0 | |
| P3R1 | 0 | |
| P3R2 | 0 | |
| P4R1 | 1 | 0.365 |
| P4R2 | 1 | 1.235 |
| P5R1 | 1 | 0.735 |
| P5R2 | 1 | 0.885 |

Table 13 below further lists various values of Embodiment 3 and values corresponding to parameters which are specified in the above conditions.

Figure 10:
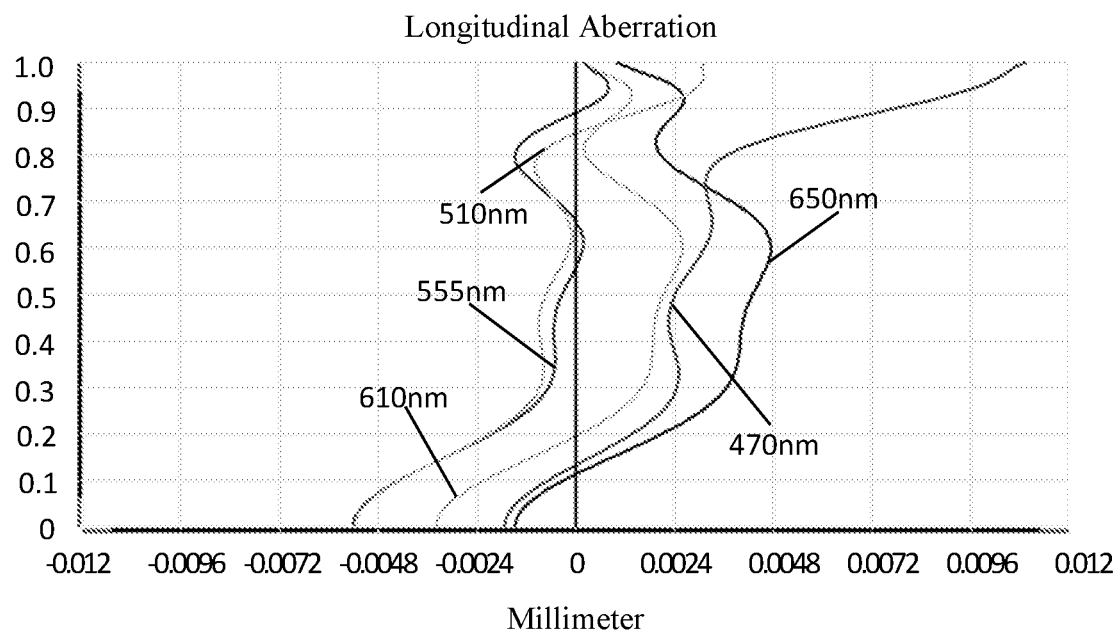
FIG. 10 is a schematic diagram of a longitudinal aberration of the camera optical lens shown in FIG. 9.
Figure 11:
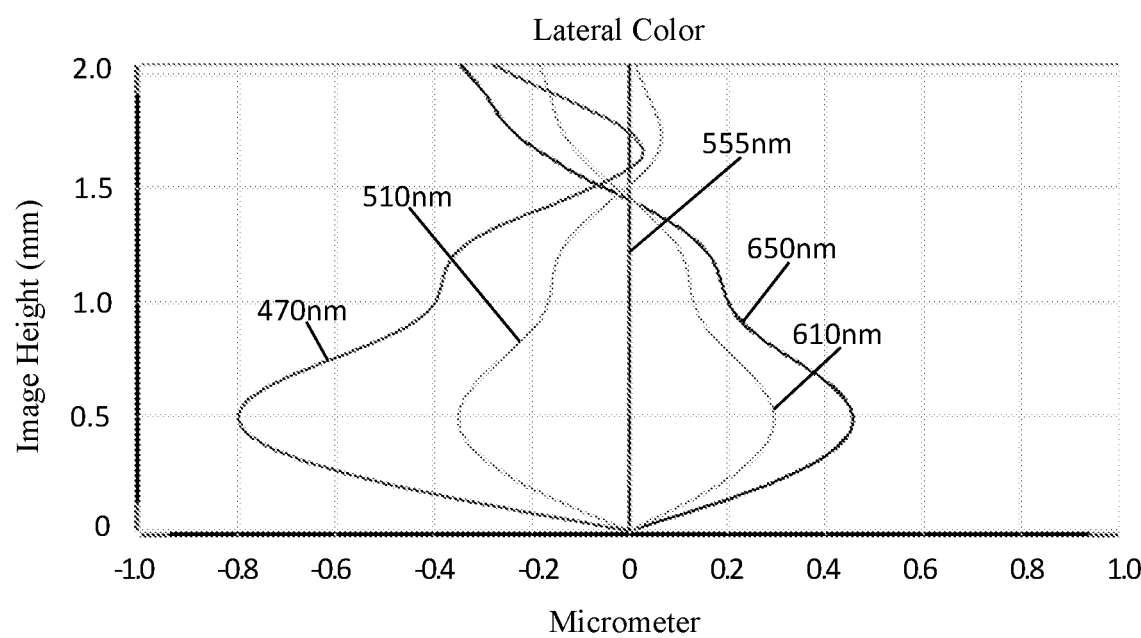
FIG. 11 is a schematic diagram of a lateral color of the camera optical lens shown in FIG. 9.
Figure 12:
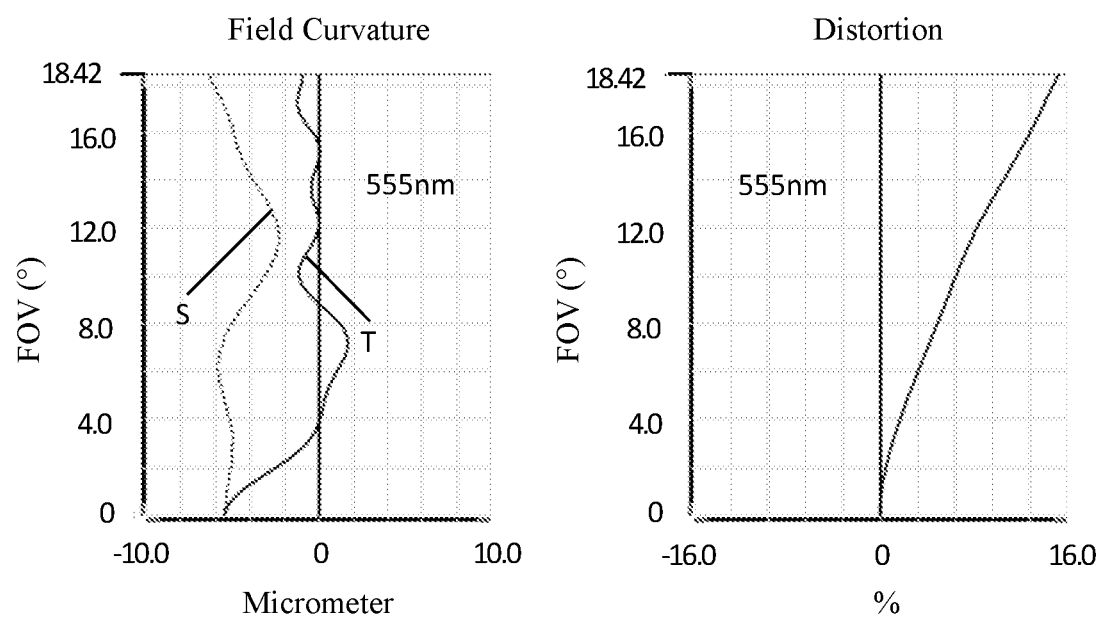
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 610 nm, 555 nm, 510 nm, 650 nm and 470 nm after passing the camera optical lens 30. FIG. 12 illustrates field curvature and distortion of light with a wavelength of 555 nm after passing the camera optical lens 30, in which a field curvature S is a field curvature in a sagittal direction and T is a field curvature in a tangential direction.

In the present embodiment, the entrance pupil diameter of the camera optical lens 30 is 2.170 mm. The image height is 2.04 mm. The FOV along a diagonal direction is 36.84°. Thus, the camera optical lens 30 is an ultra-thin, large-aperture, long-focal-length lens, thereby leading to better optical characteristics.

Table 13 below further lists various values of Embodiment 1, Embodiment 2, and Embodiment 3 and parameters which are specified in the above conditions.

TABLE 13

| Parameters and Conditions | Embodiment 1 | Embodiment 2 | Embodiment 3 |
|---|---|---|---|
| f | 6.665 | 6.735 | 5.251 |
| f1 | 3.203 | 2.425 | 3.360 |
| f2 | −4.864 | −2.597 | −5.316 |
| f3 | 14.901 | 16.596 | 10.649 |
| f4 | −4.779 | −7.400 | −5.316 |
| f5 | 18.005 | 26.269 | 11.027 |
| f12 | 6.092 | 7.634 | 6.345 |
| Fno | 2.42 | 2.42 | 2.42 |
| f1/f | 0.48 | 0.36 | 0.64 |
| f5/f | 2.70 | 3.90 | 2.10 |
| d6/d8 | 1.12 | 1.29 | 0.91 |
| (R5 + R6)/(R5 − R6) | −4.94 | −9.95 | −2.10 |

The above are only the embodiments of the present disclosure. It should be understood that those of ordinary skill in the art can make improvements without departing from the inventive concept of the present disclosure, but these improvements all fall within the scope of the present disclosure.

What is claimed is:

1. A camera optical lens, comprising, from an object side to an image side:
   a first lens;
   a second lens;
   a third lens;
   a fourth lens; and
   a fifth lens,
   wherein the camera optical lens satisfies following conditions:

$0.35 \leq f1/f \leq 0.65$;

$2.00 \leq f5/f \leq 4.00$;

$0.90 \leq d6/d8 \leq 1.30$; and $-10.00 \leq (R5+R6)/(R5-R6) \leq -2.00$, where
   f denotes a focal length of the camera optical lens;
   f1 denotes a focal length of the first lens;
   f5 denotes a focal length of the fifth lens;
   d6 denotes an on-axis distance from an image side surface of the third lens to an object side surface of the fourth lens;
   d8 denotes an on-axis distance from an image side surface of the fourth lens to an object side surface of the fifth lens;
   R5 denotes a curvature radius of an object side surface of the third lens; and
   R6 denotes a curvature radius of the image side surface of the third lens.

2. The camera optical lens as described in claim 1, further satisfying a following condition:

$0.10 \leq d2/d4 \leq 0.40$, where
   d2 denotes an on-axis distance from an image side surface of the first lens to an object side surface of the second lens; and
   d4 denotes an on-axis distance from an image side surface of the second lens to the object side surface of the third lens.

3. The camera optical lens as described in claim 1, further satisfying following conditions:

$-1.81 \leq (R1+R2)/(R1-R2) \leq -0.43$; and $0.07 \leq d1/TTL \leq 0.22$, where
   R1 denotes a curvature radius of an object side surface of the first lens;
   R2 denotes a curvature radius of an image side surface of the first lens;
   d1 denotes an on-axis thickness of the first lens; and
   TTL denotes a total optical length from the object side surface of the first lens to an image plane of the camera optical lens along an optic axis.

4. The camera optical lens as described in claim 1, further satisfying following conditions:

$-2.02 \leq f2/f \leq -0.26$;

$0.38 \leq (R3+R4)/(R3-R4) \leq 1.72$; and $0.02 \leq d3/TTL \leq 0.07$, where
   f2 denotes a focal length of the second lens;
   R3 denotes a curvature radius of an object side surface of the second lens;

R4 denotes a curvature radius of an image side surface of the second lens;

d3 denotes an on-axis thickness of the second lens; and

TTL denotes a total optical length from an object side surface of the first lens to an image plane of the camera optical lens along an optic axis.

5. The camera optical lens as described in claim 1, further satisfying following conditions:

$$1.01 \leq f3/f \leq 3.70; \text{ and}$$

$$0.03 \leq d5/TTL \leq 0.27,$$

where f3 denotes a focal length of the third lens;

d5 denotes an on-axis thickness of the third lens; and

TTL denotes a total optical length from an object side surface of the first lens to an image plane of the camera optical lens along an optic axis.

6. The camera optical lens as described in claim 1, further satisfying following conditions:

$$-2.20 \leq f4/f \leq -0.48;$$

$$0.25 \leq (R7+R8)/(R7-R8) \leq 2.24; \text{ and}$$

$$0.04 \leq d7/TTL \leq 0.24,$$

where f4 denotes a focal length of the fourth lens;

R7 denotes a curvature radius of the object side surface of the fourth lens;

R8 denotes a curvature radius of the image side surface of the fourth lens;

d7 denotes an on-axis thickness of the fourth lens; and

TTL denotes a total optical length from an object side surface of the first lens to an image plane of the camera optical lens along an optic axis.

7. The camera optical lens as described in claim 1, further satisfying following conditions:

$$-5.94 \leq (R9+R10)/(R9-R10) \leq 3.16; \text{ and}$$

$$0.03 \leq d9/TTL \leq 0.23,$$

where

R9 denotes a curvature radius of the object side surface of the fifth lens;

R10 denotes a curvature radius of an image side surface of the fifth lens;

d9 denotes an on-axis thickness of the fifth lens; and

TTL denotes a total optical length from an object side surface of the first lens to an image plane of the camera optical lens along an optic axis.

8. The camera optical lens as described in claim 1, further satisfying a following condition:

$$TTL/IH \leq 3.31,$$

where

TTL denotes a total optical length from an object side surface of the first lens to an image plane of the camera optical lens along an optic axis; and IH denotes an image height of the camera optical lens.

9. The camera optical lens as described in claim 1, further satisfying a following condition:

$$f/IH \geq 2.57°,$$

where

IH denotes an image height of the camera optical lens.

10. The camera optical lens as described in claim 1, further satisfying a following condition:

$$Fno \leq 2.43,$$

where

Fno denotes an F number of the camera optical lens.

* * * * *